(12) United States Patent
Hayhow et al.

(10) Patent No.: US 7,617,503 B2
(45) Date of Patent: Nov. 10, 2009

(54) METHOD AND APPARATUS FOR DETERMINING WHICH OF TWO COMPUTER PROCESSES SHOULD PERFORM A FUNCTION X

(75) Inventors: Reid Hayhow, La Porte, CO (US); Robert S. Kolman, Longmont, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 1054 days.

(21) Appl. No.: 10/941,165

(22) Filed: Sep. 15, 2004

(65) Prior Publication Data

US 2006/0085786 A1 Apr. 20, 2006

(51) Int. Cl.
*G06F 13/00* (2006.01)
(52) U.S. Cl. .................. 719/330; 718/100; 718/106; 709/201; 709/203
(58) Field of Classification Search .......... 719/330; 718/100, 106; 709/201, 203
See application file for complete search history.

(56) References Cited

U.S. PATENT DOCUMENTS

| 5,325,525 | A  | * | 6/1994 | Shan et al. | 718/104 |
| 6,678,715 | B1 | * | 1/2004 | Ando       | 718/105 |
| 7,165,252 | B1 | * | 1/2007 | Xu         | 718/102 |

* cited by examiner

*Primary Examiner*—Andy Ho
(74) *Attorney, Agent, or Firm*—Holland & Hart, LLP

(57) ABSTRACT

In one embodiment, a method for determining which of two computer processes should perform a function X includes the following actions. If a second computer process is dependent on data received at a first computer process, it is determined whether the second computer process currently requires the data. If the second computer does not currently require the data, it is determined whether 1) a cost of the second computer process performing a function X on the data, plus 2) a cost of transmitting the data to the second computer process, exceeds 3) a cost of the first computer process performing the function X on the data. If the first two costs exceed the latter, the function X is caused to be performed by the first computer process.

16 Claims, 2 Drawing Sheets

METHOD AND APPARATUS FOR DETERMINING WHICH OF TWO COMPUTER PROCESSES SHOULD PERFORM A FUNCTION X

BACKGROUND

The responsibility for performing computer-based tasks is often divided amongst a plurality of computer processes. In some cases, the computer processes may execute more or less autonomously with respect to each other. In other cases, the computer processes may need to communicate with each other. These communications are commonly referred to as inter-process communications.

SUMMARY OF THE INVENTION

In one embodiment, a method for determining which of two computer processes should perform a function X comprises the following actions. If a second computer process is dependent on data received at a first computer process, it is determined whether the second computer process currently requires the data. If the second computer does not currently require the data, it is determined whether 1) a cost of the second computer process performing a function X on the data, plus 2) a cost of transmitting the data to the second computer process, exceeds 3) a cost of the first computer process performing the function X on the data. If the first two costs exceed the latter, the function X is caused to be performed by the first computer process.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

The clients of a client-server computer system are often configured as "thin" clients. That is, the clients shoulder very little of the computer system's processing burden and instead transmit data to a central server (or servers) for processing. At times, however, clients may be "thick", such that they are capable of processing much of their own data.

Figure 1:
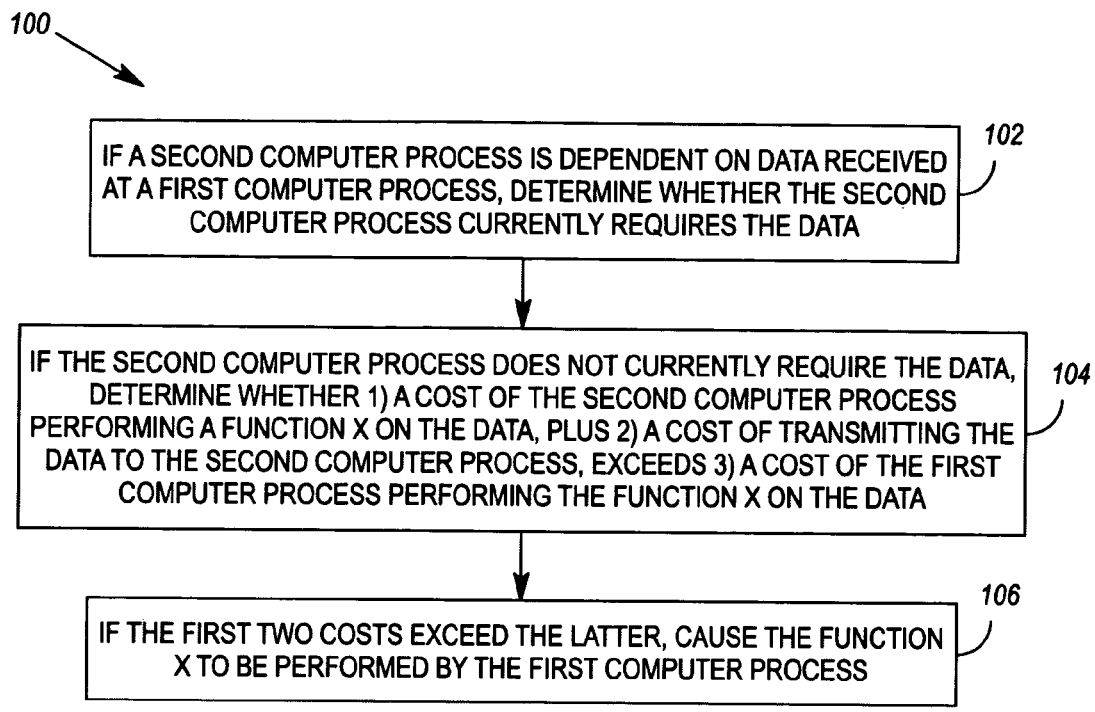
FIG. 1 illustrates an exemplary method for determining which of two computer processes should perform a function X.

The decision to implement a client as "thin" or "thick" is often dictated by cost considerations and/or the need to maintain data consistency in a shared repository. It would be desirable, however, if the decision to perform a function X was dictated, at least in part, by the cost of transmitting data from one process to another. FIG. 1 therefore illustrates an exemplary method 100 for determining which of two computer processes (e.g., client and server processes) should perform a function X.

In accordance with the method 100, if a second computer process is dependent on data received at a first computer process, a determination 102 is made as to whether the second computer process currently requires the data. The second computer process may be determined to currently require data if, for example, the second computer process is stalled; the second computer process is about to stall; or the data is needed by the second computer process to maintain consistency with a third computer process that accesses the second computer process.

If the second computer process does not currently require the data, the method 100 continues with a determination 104 of whether 1) the cost of the second computer process performing the function X on the data, plus 2) the cost of transmitting the data to the second computer process, exceeds 3) a cost of the first computer process performing the function X on the data. If the first two costs exceed the third cost, the function X is caused 106 to be performed by the first computer process. If the function X is not performed by the first computer process, the data may be transmitted to the second computer process for performance of the function X.

Note that the cost of transmitting the data to the second computer process may often be a large factor in determining which process should perform a function. For example, if a client would require 50 milliseconds (ms) to execute a function and a server process would require only 10 ms to execute the function, but the cost of transmitting the data to the server process is 100 ms, then a decision may be made to perform the function locally at the client end.

In addition to comparing costs, the method 100 may also determine costs. This may comprise any one or more of: determining the number of instructions that a process would need to execute to perform the function X, determining the availability or speed of resources that are available to a process, or determining the cost of locally storing the data. The determination of costs may also assess the size of the data, or the difficulty of manipulating the data (including whether the data can be manipulated in memory without frequent calls to storage). Costs may also depend on the processing bandwidth of one or both of the processes, as well as the time sensitivity of accomplishing a task.

The function X may take various forms, including that of a function that stores the data, that of a function that compiles the data with other data, or that of a function that manipulates the data.

In some cases, program code may dictate that a given function be performed by a given process, in these cases, the method 100 can merely defer to the default process for performing the function.

Figure 2:
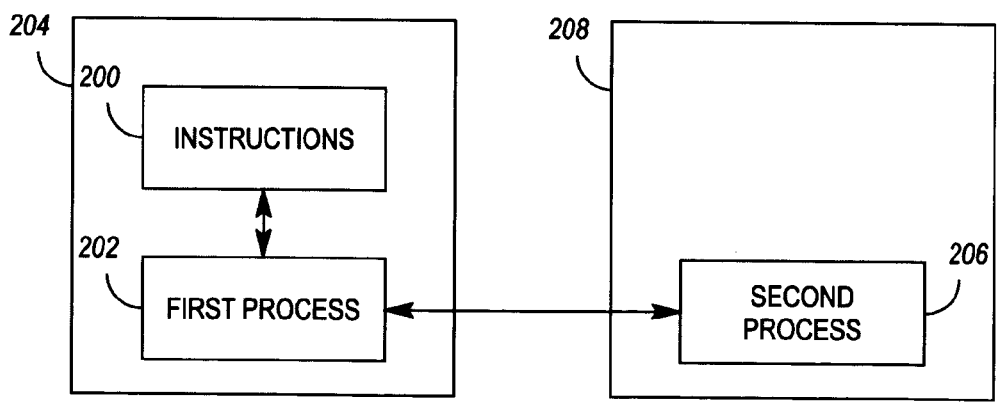
FIG. 2 illustrates exemplary apparatus for performing the FIG. 1 method.

As shown in FIG. 2, a first process 202 may be hosted by a client machine 204, and the second process 206 may be hosted by a server machine 208 (although the processes 202, 206 could alternately be hosted by the same machine 204). In the system shown in FIG. 2, the method 100 may be embodied in sequences of instructions 200 stored on machine-readable media that, when executed by a machine, cause the machine to perform the actions of the method 100. In one embodiment, the instructions 200 of the method 100 are integrated with the first process 202, or are executed by a machine 204 that hosts the first process 202. In this manner, the instructions 200 may be executed dynamically, during execution of a particular application or utility. In another embodiment, the instructions 200 of the method 100 may be executed during an analysis of program code, and more or less static decisions as to when data will be transmitted from one process 202 to another 206 may be integrated into the code (or used to divide the code between two processes). In the latter embodiment, determining whether a second process "currently requires data" may comprise determining whether program order dictates a conclusion that the second process currently requires data.

In one embodiment, the method 100 is used to reduce inter-process communications between two or more processes executed by automated test equipment. For example, consider a scenario wherein the first computer process executes a testflow and the second computer process executes a test number engine. As defined herein, a "testflow" is any portion of a test program that is used to specify the type, number or order of subtests that may be executed during circuit test. As defined herein, "circuit test" is intended to include the test of any circuit, whether as part of integrated circuit test, system-on-a-chip test, board test, or system test.

During execution of the testflow, it may desirable to assign a unique test number to the result of each subtest. One way to ensure that assigned test numbers are unique is to track testflow context information. As used herein, testflow context information is any information that assists in defining what portion of a testflow is being executed. By way of example, testflow context information may comprise information such as a test suite designator, a port designator, a vector label, a vector designator, or a pin designator. Testflow context information may also comprise a loop designator and/or loop iteration designator for each of a number of loop layers (e.g., nested loops) that have been entered during execution of a testflow. As used herein, the term "designator" encompasses a string, number or any other means that can be used to designate a test suite, loop or other testflow context.

Figure 3:
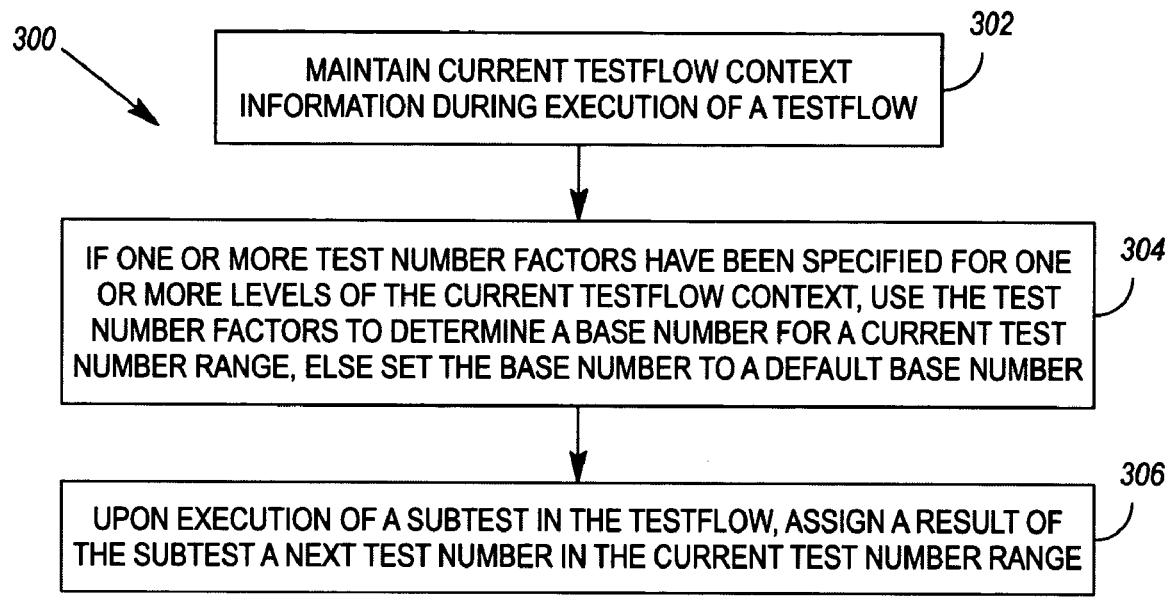
FIG. 3 illustrates an exemplary method for assigning test numbers.

FIG. 3 illustrates an exemplary method 300 for assigning test numbers. In accordance with the method 300, current testflow context information is maintained 302 during execution of a testflow. If one or more test number factors have been specified for one or more levels of the current testflow context, the test number factors are used 304 by the method 300 to determine a base number (e.g., a beginning number or reference number) for a current test number range. Otherwise, the base number is set to a default base number. Upon execution of a subtest in the testflow, the result of the subtest is assigned 306 a next test number in the current test number range.

In one embodiment of the method 300, the base number is compiled by aggregating (e.g., summing or multiplying) a plurality of test number factors that have been specified for various levels of the current testflow context. By way of example, the test number factors may comprise increments or addends that are specified at any or all of: a loop level, a test suite level, or a subtest level.

Additional details on how test numbers may be assigned using testflow context information are disclosed in the U.S. patent application of Kolman, et al. entitled "Methods and Apparatus that Use Contextual Test Number Factors to Assign Test Numbers" (Ser. No. 10/839,824 filed May 5, 2004). This application is hereby incorporated by reference for all that it discloses.

Although a testflow execution process may be responsible for extracting testflow context information from a testflow, there is a choice as to which process (i.e., the testflow execution process or the test number engine) compiles the testflow context information. In accordance with the method 100, this choice may be made by weighing the costs of each process performing the compilation, along with the cost of transmitting the testflow context information to the test number engine. Another consideration is whether the test number engine currently requires the testflow context information. If the testflow execution process requires a new test number, and the new test number is unknown, then the test number engine would require the testflow context information at this point (i.e., so that it can determine the appropriate new test number). However, the test number engine might also require the testflow context information to maintain consistency with other processes that request test numbers from the test number engine.

By way of example, one or both of the processes discussed above could be executed by a system-on-a-chip tester, such as the Agilent 93000 SOC Series tester (manufactured by Agilent Technologies, Inc. of Palo Alto, Calif., USA).

What is claimed is:

1. A method for determining which of two computer processes should perform a function X, comprising:
    if a second computer process executed by a server machine is dependent on data received at a first computer process executed by a client machine, determining whether the second computer process currently requires the data;
    if the second computer process does not currently require the data, determining whether i) a cost of the second computer process performing a function X on the data, plus ii) a cost of transmitting the data to the second computer process, exceeds iii) a cost of the first computer process performing the function X on the data; and
    if i)+ii) exceeds iii), causing the function X to be performed by the first computer process, thereby reducing interprocess communication between the first computer process executed by the client machine and the second computer process executed by the server machine.

2. The method of claim 1, wherein the second computer process is determined to currently require the data if the second computer process is stalled.

3. The method of claim 1, wherein the second computer process is determined to currently require the data if the second computer process is about to stall.

4. The method of claim 1, wherein the second computer process is determined to currently require the data if the data is needed by the second computer process to maintain consistency with a third computer process that accesses the second computer process.

5. The method of claim 1, further comprising, determining the cost of the first computer process performing the function X, said cost including a cost of locally storing the data.

6. The method of claim 1, further comprising, determining the cost of each computer process performing the function X, including determining the number of instructions that each process would need to execute to perform the function X.

7. The method of claim 1, further comprising, determining said costs, said costs being based, at least in part, on a size of said data.

8. The method of claim 1, wherein the function X stores the data.

9. The method of claim 1, wherein the function X compiles the data with other data.

10. The method of claim 1, wherein the function X manipulates the data.

11. The method of claim 1, wherein the first computer process executes a testflow, wherein the second computer process executes a test number engine, and wherein the second computer process requires the data before a test number may be provided to the first computer process.

12. The method of claim 11, wherein the function X comprises compiling current testflow context information on which said test number is based.

13. The method of claim 1, wherein, if the function X is not performed by the first computer process, the data is transmitted to the second computer process for performance of the function X.

14. A number of machine-readable media having stored thereon sequences of instructions that, when executed by a machine, cause the machine to perform the actions of:

if a second computer process is dependent on data received at a first computer process, determining whether the second computer process currently requires the data;

if the second computer process does not currently require the data, determining whether i) a cost of the second computer process performing a function X on the data, plus ii) a cost of transmitting the data to the second computer process, exceeds iii) a cost of the first computer process performing the function X on the data; and if i)+ii) exceeds iii), performing the function X by the first computer process.

15. The machine-readable media of claim 14, wherein the first computer process executes a testflow, wherein the second computer process executes a test number engine, and wherein the second computer process requires the data before a test number may be provided to the first computer process.

16. The machine-readable media of claim 15, wherein the function X comprises compiling current testflow context information on which said test number is based.

* * * * *

UNITED STATES PATENT AND TRADEMARK OFFICE
CERTIFICATE OF CORRECTION

PATENT NO. : 7,617,503 B2  Page 1 of 1
APPLICATION NO. : 10/941165
DATED : November 10, 2009
INVENTOR(S) : Hayhow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1425 days.

Signed and Sealed this

Nineteenth Day of October, 2010

David J. Kappos
*Director of the United States Patent and Trademark Office*